United States Patent
Sawada et al.

[11] Patent Number: 5,526,207
[45] Date of Patent: Jun. 11, 1996

[54] ROTARY HEAD CYLINDER HAVING A FIXED CYLINDER PROJECTION GENERATING A LIFTING FORCE AT A LOWER EDGE OF A TAPE ON THE CYLINDER TO INCREASE AN UPPER EDGE RESTRICTING FORCE

[75] Inventors: Hiroshi Sawada, Suita; Takashi Ichiyanagi; Masaru Nagaike, both of Hirakata; Hitoshi Minabe, Neyagawa, all of Japan

[73] Assignee: Matsushita Electric Industrial Co., Ltd., Osaka-fu, Japan

[21] Appl. No.: 316,363

[22] Filed: Oct. 3, 1994

Related U.S. Application Data

[63] Continuation of Ser. No. 924,933, Aug. 5, 1992, abandoned.

[30] Foreign Application Priority Data

Aug. 7, 1991 [JP] Japan .................... 3-197631

[51] Int. Cl.$^6$ .................................. G11B 15/60
[52] U.S. Cl. .............. 360/107; 360/84; 360/130.24
[58] Field of Search ............. 360/84, 104, 107, 360/130.22, 130.23, 130.24, 85, 130.21

[56] References Cited

U.S. PATENT DOCUMENTS

| | | |
|---|---|---|
| 4,833,562 | 5/1989 | Kochi et al. ............. 360/130.24 |
| 4,939,606 | 7/1990 | Nakanishi ............. 360/85 |
| 5,060,104 | 10/1991 | Kitaori et al. ............. 360/130.22 |
| 5,220,475 | 6/1993 | Fujiki et al. ............. 360/130.24 |

FOREIGN PATENT DOCUMENTS

| | | | |
|---|---|---|---|
| 0145753 | 7/1986 | Japan | 360/130.21 |
| 1119949 | 5/1989 | Japan | 360/130.21 |
| 2-40119 | 2/1990 | Japan | 360/130.21 |
| 2203459 | 8/1990 | Japan | 360/130.24 |
| 3295055 | 12/1991 | Japan | 360/130.21 |

*Primary Examiner*—Stuart S. Levy
*Assistant Examiner*—William R. Korzuch
*Attorney, Agent, or Firm*—Wenderoth, Lind & Ponack

[57] ABSTRACT

A rotary head cylinder of a rotary head assembly includes a first projection for reducing jitter. The first projection is smoothly formed in the vicinity of a point where a tape is separated from a fixed cylinder and is extended in a lengthwise direction of the tape. A second projection is provided for increasing a restricting force on an upper edge of the tape in a direction toward a surface of the fixed cylinder. The second projection is smoothly formed in the vicinity of a lower edge of the tape at the same point on the fixed cylinder and is extended in the lengthwise direction of the tape.

9 Claims, 7 Drawing Sheets

Fig. 5 - PRIOR ART
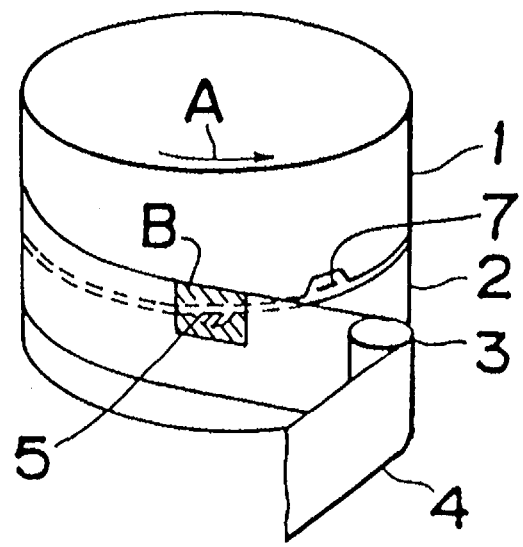
Fig. 6 - PRIOR ART
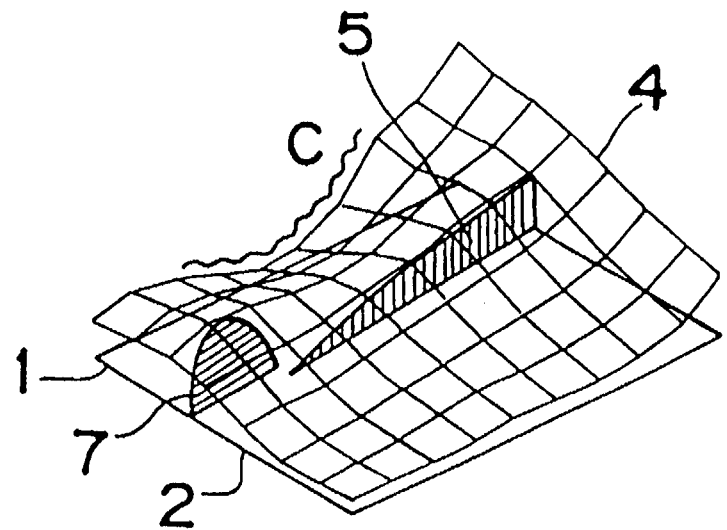

Fig. 7A - PRIOR ART
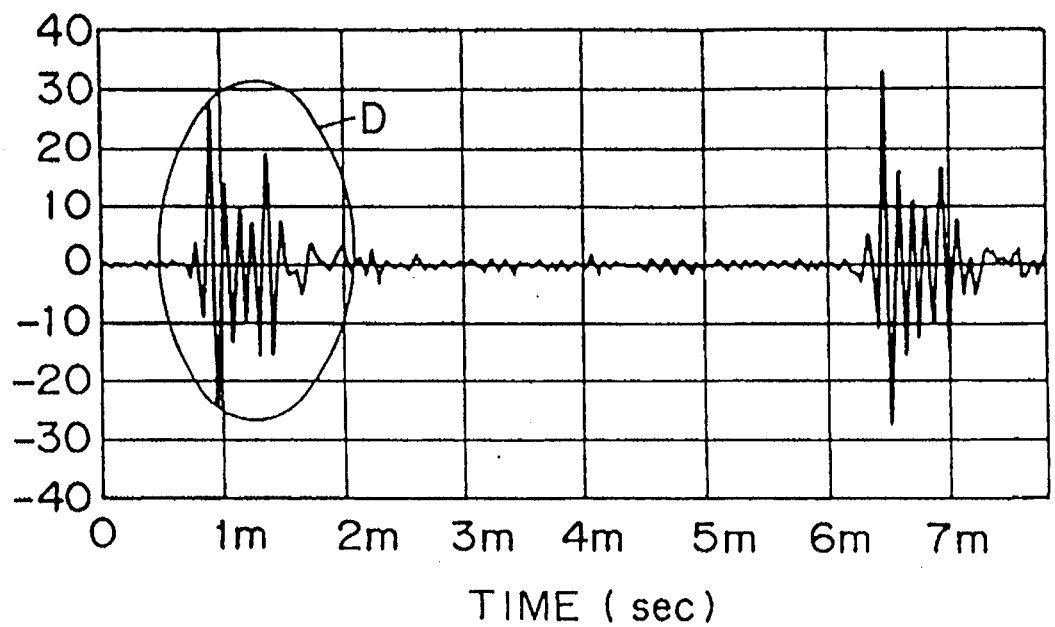
Fig. 7B - PRIOR ART
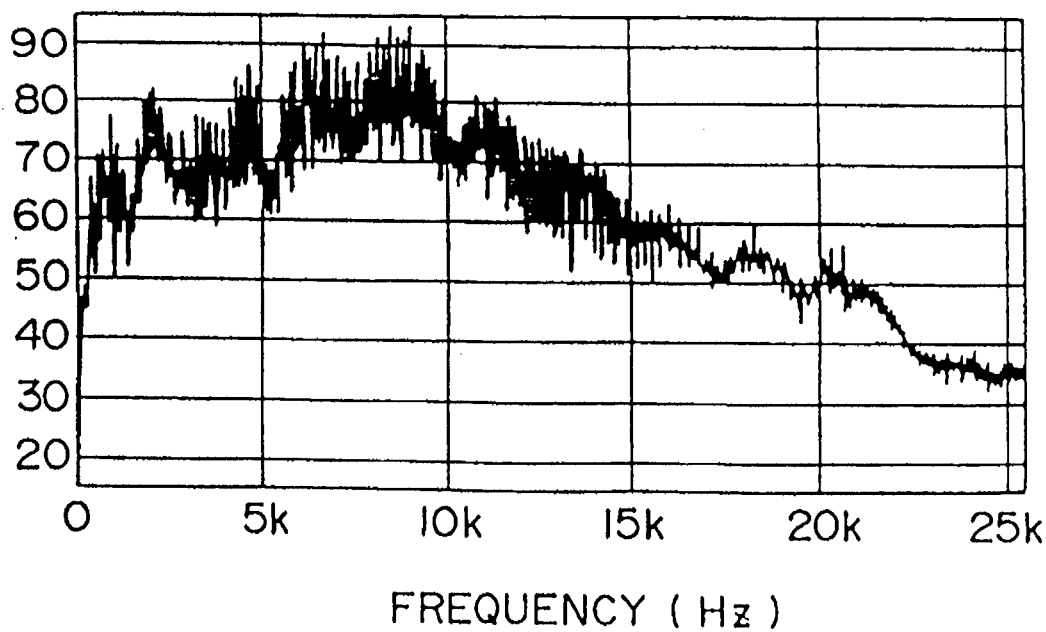

ROTARY HEAD CYLINDER HAVING A FIXED CYLINDER PROJECTION GENERATING A LIFTING FORCE AT A LOWER EDGE OF A TAPE ON THE CYLINDER TO INCREASE AN UPPER EDGE RESTRICTING FORCE

This application is a continuation of now abandoned application Ser. No. 07/924,933, filed Aug. 5, 1992.

BACKGROUND OF THE INVENTION

The present invention relates to a rotary head cylinder designed to suppress the generation of noise when a magnetic head passes a separating position thereof from a tape to thereby to improve recording sound quality.

A projection is provided at a part of a conventional VTR cylinder where a tape is separated from the cylinder so as to reduce the jitters. In consequence, the running tape levitates from the surface of the cylinder short of the projection, giving rise to a distortion when a magnetic head passes the position short of the projection. The resultant snap-through phenomenon invites vibration of the tape, which accompanies undesirable noises. When recording, the noises caused by the vibration are recorded through a recording microphone to adversely influence the sound quality.

The structure of a conventional rotary head cylinder will be depicted hereinbelow. FIG. 5 is a perspective view of a conventional rotary head cylinder seen from the direction of a tape separating position. In FIG. 5, a magnetic head 7 is provided between a rotary cylinder 1 and a fixed cylinder 2, and is rotated along with the rotary cylinder 1 in the direction of an arrow A. A tape 4 is spirally wound around the outer peripheral surface of the cylinder by a guide post 3. The magnetic head 7 moves away from an upper edge of the tape 4. A projection 5 is provided in the vicinity of a point where the tape 4 is detached from the magnetic head 7 to thereby to reduce the jitters. FIG. 6 is an enlarged view of an area B of FIG. 5, showing the distortion of the tape generated when the magnetic head passes the position of the projection. FIGS. 7A and 7B are waveform diagrams of the time response and the frequency response obtained when noises is measured in the vicinity of the tape separating point.

In a general rotary head cylinder of the above structure, as shown in FIG. 5, the disturbance of an image, called the jitters, is reduced by means of the first projection 5 provided at a part on the fixed cylinder 2 where the tape 4 is separated from the magnetic head. The projection 5 projects somewhat more than the magnetic head 7, lifting the tape 4 above the surface of the cylinder 2 at the point where the magnetic head 7 is separated from the tape 4, so that the magnetic head 7 is smoothly separated from the tape 4. In this manner, the jitter is decreased as the vibration of the tape 4 is reduced. However, the projection 5 causes the upper edge of the tape 4 to levitate from the surface of the cylinder, and therefore the tape 4 is partially deflected, as represented by C in FIG. 6, immediately before the magnetic head 7 passes the point. The distortion is further spread along with the advancement of the magnetic head 7. When the distortion is relieved, the snap-through phenomenon is brought about, thereby suddenly deforming the tape 4 as much as if the tape sprang. The tape 4 is partially vibrated as a result of the deformation impact. The effect of reducing the jitter with the projection 5 is eliminated. At the same time, noises are generated synchronously when the magnetic head 7 passes the point, as indicated by D in FIG. 7A. The noises are taken through a recording microphone when recording, and the sound quality is badly influenced. This imposes a real obstacle to achievement of a miniature and high-fidelity VTR, particularly, a camcorder having a microphone and a mechanism of a driving system incorporated together therein.

SUMMARY OF THE INVENTION

The object of the present invention is therefore to provide an improved rotary head cylinder capable of suppressing the generation of noise when a magnetic head passes a tape separating point to thereby improve the recording sound quality.

In accomplishing these and other objects, according to one aspect of the present invention, there is provided a rotary head cylinder of a rotary head assembly, comprising a first projection for reducing jitter. The first projection is smoothly formed in the vicinity of a point where a tape is separated from a fixed cylinder, i.e. substantially at the point; and is in a lengthwise direction of the tape. A second projection is provided for increasing a restricting force on an upper edge of the tape in a direction toward a surface of the fixed cylinder. The second projection is smoothly formed in the vicinity of a lower edge of the tape at the same point on the fixed cylinder and is extended in the lengthwise direction of the tape.

According to the present invention, in a condition where the jitter is reduced by the first projection, the restricting force on an upper edge of a tape in a direction toward the surface of the cylinder is increased by the second projection. Thus, the vibration of the tape resulting from the snap-through phenomenon when the magnetic head passes the projections is controlled. Accordingly, the noise consequent to the vibration of the tape can be decreased.

According to another aspect of the present invention, there is provided a rotary head cylinder of a rotary head assembly, comprising a projection for reducing jitter and increasing a restricting force on an upper edge of a tape in a direction toward a surface of a fixed cylinder. The projection is smoothly formed at a point where the tape is separated from the fixed cylinder on the fixed cylinder and extends in a widthwise direction of the tape.

According to the present invention, the jitter is reduced and the restricting force on an upper edge of a tape in a direction toward the surface of the cylinder is increased by the projection. Thus the vibration of the tape resulting from the snap-through phenomenon when the magnetic head passes the projections is controlled. Accordingly, the noise consequent to the vibration of the tape can be decreased.

BRIEF DESCRIPTION OF THE DRAWINGS

The above and other objects and features of the present invention will become clear from the following description, taken in conjunction with preferred embodiments thereof and with reference to the accompanying drawings, in which:

FIG. 5 is a perspective view of a conventional rotary head cylinder;

FIG. 6 is an enlarged view of an essential part of the conventional rotary head cylinder of FIG. 5;

FIG. 7A is a waveform diagram of the time response of noise in the example of FIG. 5;

FIG. 7B is a waveform diagram of the frequency response of noise in the example of FIG. 5;

DETAILED DESCRIPTION OF THE PREFERRED EMBODIMENTS

Figure 1:
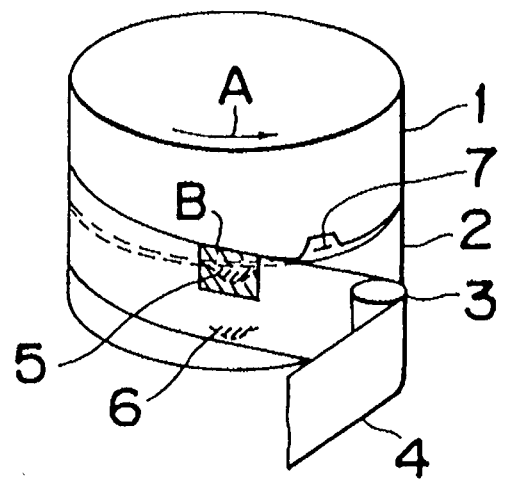
FIG. 1 is a perspective view of a rotary head cylinder according to a preferred embodiment of the present invention.

Before the description of the present invention proceeds, it is to be noted that like parts are designate by like reference numerals throughout the accompanying drawings.

Figure 2:
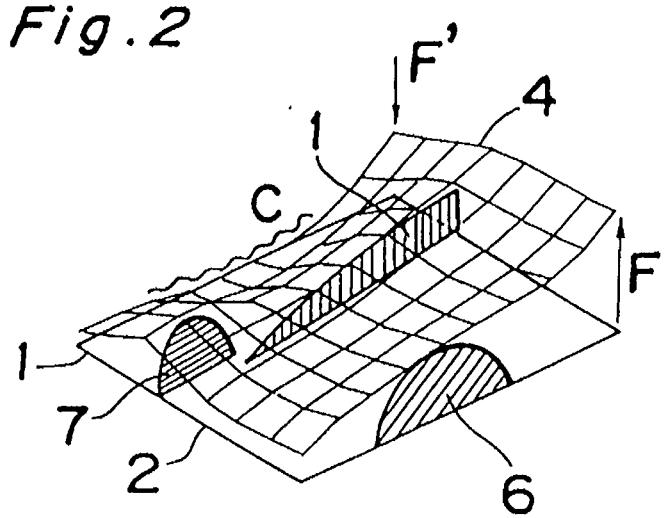
FIG. 2 is an enlarged view of a portion of the rotary head cylinder of FIG. 1.
Figure 3A:
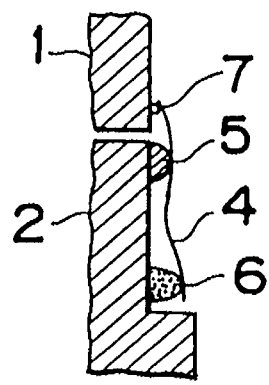
FIGS. 3A and 3B are a partial cross sectional view and a partial perspective view, respectively, of the rotary head cylinder of FIG. 1.
Figure 3B:
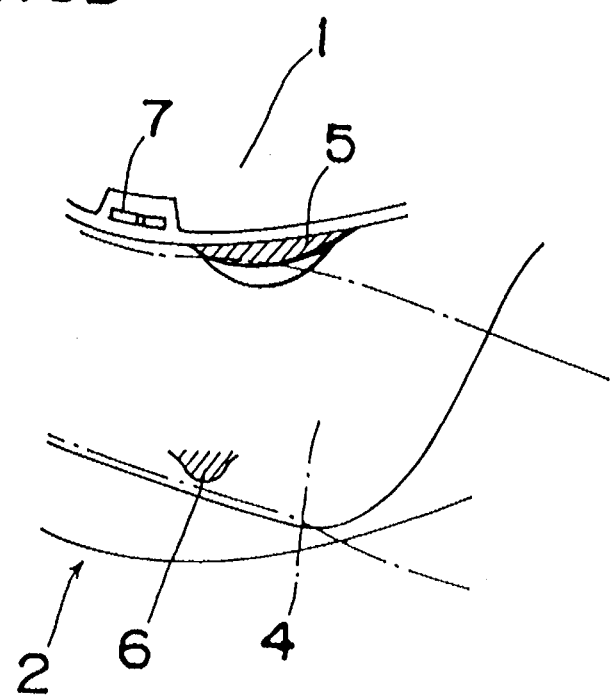
Figure 4A:
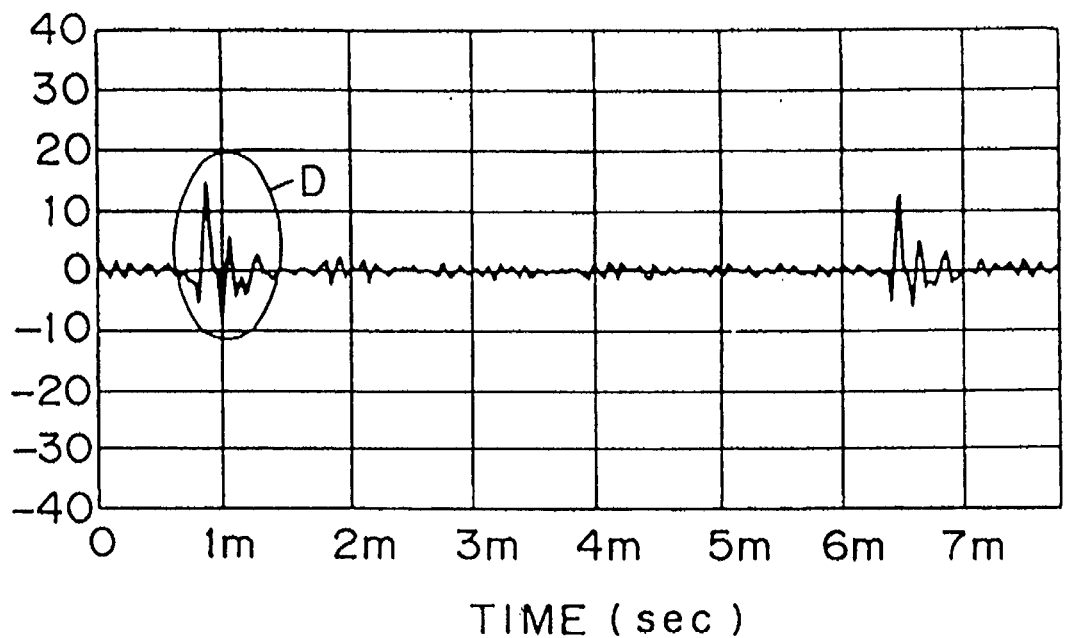
FIG. 4A is a waveform diagram of the time response of noise in the embodiment of FIG. 1.
Figure 4B:
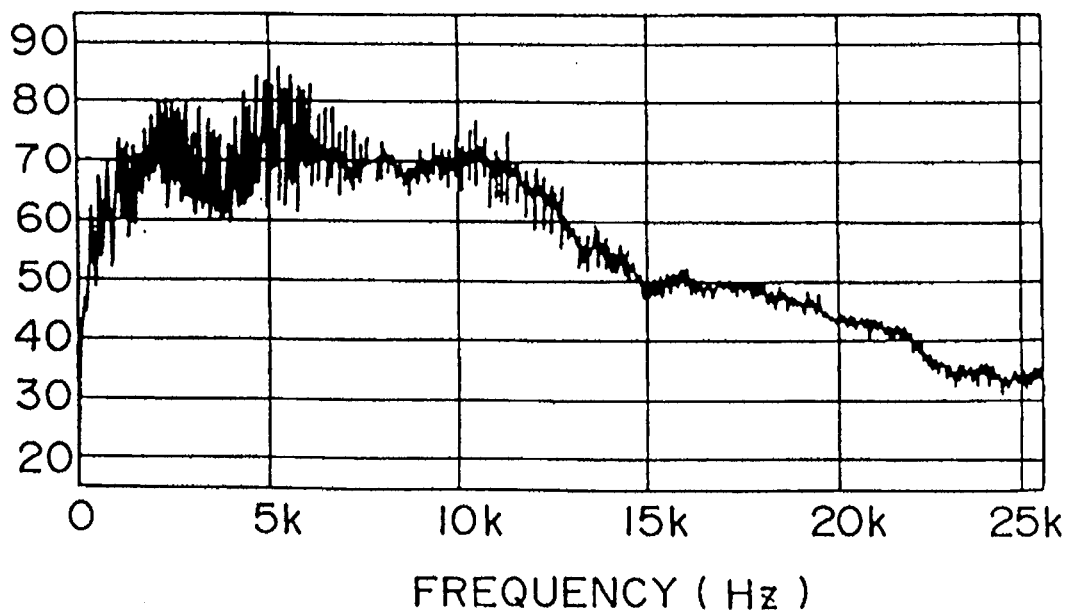
FIG. 4B is a waveform diagram of the frequency response of noise in the embodiment of FIG. 1.

Referring to FIGS. 1 to 3, a second projection 6 is positioned on the surface of a fixed cylinder 2 lower than a first projection 5 provided to prevent the jitters. That is, the second projection 6 is smoothly formed in the vicinity of a lower edge of a tape 4. Because of the second projection 6, a lifting force F for lifting the tape 4 from the surface of the cylinder 2 is generated at the lower edge of the tape 4. As a result, a pressure force F' is generated in a direction toward the surface of the cylinder 2 at the upper edge of the tape 4 in the vicinity of the separating point, as indicated in FIG. 2, according to the leverage. The pressure force F' can restrict the upper edge of the tape 4 in the direction toward the cylinder surface. In comparison with the conventional example represented by C in FIG. 6, the distortion of the tape 4 immediately before a magnetic head 7 passes the first projection 5 is much more limited, as shown by C in FIG. 2. The snap-through phenomenon of the tape 4 and accordingly, the vibration of the tape 4 can be restrained. As is understood from FIGS. 4A and 4B, the noises generated synchronously when the magnetic head 7 passes the first projection 5 can be reduced. It is clearly better for the position of the second projection 6 to be in the vicinity of the lower edge of the tape 4 right below the first projection 5. However, even if the second projection 6 is displaced from the above position, the noise can be effectively reduced so long as the second projection 6 permits the pressure force F' to act on the upper edge of the tape 4, as mentioned hereinabove.

Figure 8:
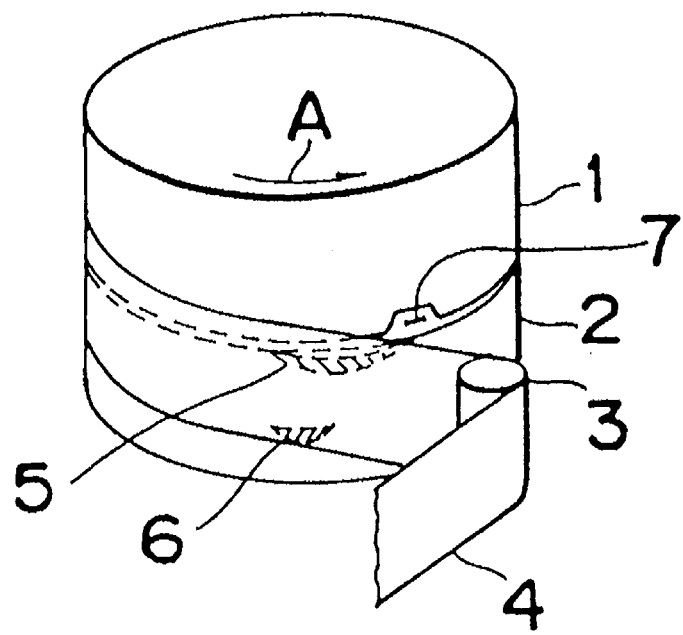
FIG. 8 is a perspective view of a rotary head cylinder according to an embodiment of the present invention.
Figure 9:
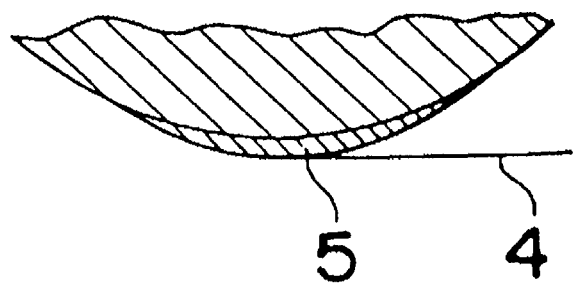
FIG. 9 is a partial, enlarged cross sectional view of the rotary head cylinder of FIG. 8.

If the upper projection 5 is smoothly extended in a circumferential direction of the fixed cylinder 2, as shown in FIGS. 8 and 9, the variation of the pressure force F', which results from a positional displacement of the second projection 6 or a change of the running speed of the tape 4, can be controlled so as to be reduced. The noise can be reduced more reliably.

The second projection 6 may be formed by pressing a tool from inside of the fixed cylinder 2 to thereby obtain plastic deformation of the cylinder surface. Cutting or bonding of an other member by an adhesive may also be used to form the second projection 6.

In an example, the width of the tape is 12.5 mm, the height and length of the first projection is 50μ and 10 mm, and the height and length of the Second projection is 100μ and 2 mm.

As is described hereinabove, since a plurality of projections are provided in a widthwise direction of the tape at the tape separating point of the fixed cylinder, it becomes possible to reduce noise when the magnetic head passes the tape separating point, thus improving the sound quality.

Figure 10:
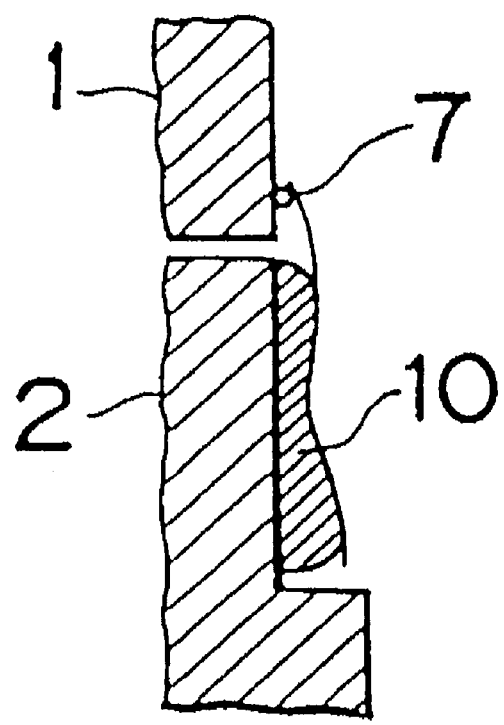
FIG. 10 is a partial cross sectional view of a rotary head cylinder according to another embodiment of the present invention.

Instead of the presence of the first and second projections 5 and 6, as shown in FIG. 10, only one projection 10 may be smoothly formed at the point where the tape 4 is separated from the fixed cylinder 2 on the fixed cylinder 2 and extended in a widthwise direction of the tape 4 so as to achieve advantages similar to the former embodiment. As can be seen from FIG. 10, a lower portion of the projection 10 projects further from the surface of the fixed cylinder 2 than an upper portion.

Although the present invention has been fully described in connection with the preferred embodiments thereof and with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A rotary head cylinder of a head assembly, comprising:
   a fixed cylinder, said fixed cylinder having a surface, a tape separation point and a tape running direction in which tape is to extend along said fixed cylinder, said tape separation point having a first position substantially thereat corresponding to one side of tape that is to extend along said fixed cylinder and a second position substantially thereat axially separated from said first position and corresponding to an opposite side of tape that is to extend along said fixed cylinder;
   a rotary cylinder coaxial with and rotatable relative to said fixed cylinder and having a magnetic head rotatable therewith;
   a first projection extending smoothly in said tape running direction at said first position substantially at said tape separation point of said fixed cylinder, said first projection being located adjacent to said rotary cylinder; and
   a second projection extending smoothly in said tape running direction at said second position substantially at said tape separation point of said fixed cylinder, said second projection being located such that said first projection on said fixed cylinder is located between said second projection and said rotary cylinder, and said second projection having no more than a partial circumferential extent on said fixed cylinder;
   wherein said second projection projects further in height from said surface of said fixed cylinder than said first projection.

2. The rotary head cylinder of claim 1, wherein the second projection is located right below the first projection on the surface of said fixed cylinder.

3. A rotary head cylinder of a head assembly, comprising:
   a fixed cylinder, said fixed cylinder having a surface, a tape separation point and a tape running direction in which tape is to extend along said fixed cylinder;

a rotary cylinder rotatable relative to said fixed cylinder and having a magnetic head rotatable therewith; and means for reducing jitter of the tape and generating a lifting force at a lower edge surface of the tape for lifting the lower edge surface of the tape from the surface of said fixed cylinder so as to generate a restricting force on an upper edge of the tape in a direction toward the surface of said fixed cylinder, said means being located at said tape separation point of said fixed cylinder;

wherein said means comprises a first projection extending smoothly in said tape running direction and a second projection extending smoothly in said tape running direction below said first projection at a point adapted to be at a lower edge of the tape to generate the lifting force at the lower edge surface of the tape so as to increase the restricting force;

wherein said second projection projects further in height from said surface of said fixed cylinder than said first projection.

4. A rotary head cylinder of a head assembly, comprising:

a fixed cylinder, said fixed cylinder having a surface, a tape separation point and a tape running direction in which tape is to extend along said fixed cylinder;

a rotary cylinder rotatable relative to said fixed cylinder and having a magnetic head rotatable therewith; and means for reducing jitter of the tape and generating a lifting force at a lower edge surface of the tape for lifting the lower edge surface of the tape from the surface of said fixed cylinder so as to generate a restricting force on an upper edge of the tape in a direction toward the surface of said fixed cylinder, said means being located at said tape separation point of said fixed cylinder;

wherein said means comprises a single projection extending smoothly in a widthwise direction of the tape;

wherein said projection has an upper portion and a lower portion, said lower portion projecting further in height from said surface of said fixed cylinder than said upper portion.

5. The rotary head cylinder of claim 4, wherein said lower portion is located right below said upper portion in height.

6. A rotary head cylinder of a head assembly, comprising:

a fixed cylinder, said fixed cylinder having a surface, a tape separation point and a tape running direction in which tape is to extend along said fixed cylinder;

a rotary cylinder rotatable relative to said fixed cylinder and having a magnetic head rotatable therewith; and a projection for reducing jitter of the tape and generating a lifting force at a lower edge surface of the tape for lifting the lower edge surface of the tape from the surface of said fixed cylinder so as to increase a restricting force on an upper edge of the tape in a direction toward the surface of said fixed cylinder, said projection extending smoothly on said fixed cylinder in a widthwise direction of the tape at said tape separation point, said projection having separate raised portions spaced in the widthwise direction at said tape separation point and said projection having no more than a partial circumferential extent on said fixed cylinder.

7. The rotary head cylinder of claim 6, wherein said projection has an upper portion and a lower portion, said lower portion projecting further from said surface of said fixed cylinder than said upper portion.

8. The rotary head cylinder of claim 7, wherein said lower portion is located right below said upper portion in height.

9. The rotary head cylinder of claim 6, wherein said projection has a circumferential extent on said fixed cylinder that begins and ends within the vicinity of said tape separation point.

* * * * *